United States Patent
Brenner et al.

(10) Patent No.: US 8,496,858 B2
(45) Date of Patent: Jul. 30, 2013

(54) SELF-SUPPORTING OPTICAL FIBER SPOOL AND METHOD FOR THE PRODUCTION THEREOF

(75) Inventors: Axel Brenner, Bremen (DE); Sonke Huckfeldt, Elmshorn (DE); Wilfried Junge, Bremen (DE); Jurgen Lindner, Ganderkesee (DE); Dirk Fuhrmann, Wedel (DE); Ralf Bartholomaus, Wedel (DE)

(73) Assignee: Atlas Elektronik GmbH, Bremen (DE)

( * ) Notice: Subject to any disclaimer, the term of this patent is extended or adjusted under 35 U.S.C. 154(b) by 395 days.

(21) Appl. No.: 12/677,039

(22) PCT Filed: Sep. 5, 2008

(86) PCT No.: PCT/EP2008/007267
§ 371 (c)(1),
(2), (4) Date: Aug. 13, 2010

(87) PCT Pub. No.: WO2009/036897
PCT Pub. Date: Mar. 26, 2009

(65) Prior Publication Data
US 2010/0301501 A1    Dec. 2, 2010

(30) Foreign Application Priority Data
Sep. 13, 2007 (DE) .......................... 10 2007 043 719

(51) Int. Cl.
*B29D 11/00* (2006.01)
(52) U.S. Cl.
USPC ........... 264/1.24; 264/1.28; 264/1.6; 264/1.7; 264/2.1; 264/2.7; 264/28

(58) Field of Classification Search
USPC ............ 264/1.24, 1.28, 136, 526, 454, 37.14, 264/37.16, 37.31, 917, 632, 512, 520, 171.12, 264/171.26, 177.14, 209.1, 523, 1.6, 1.7, 264/2.1, 2.7, 28; 242/227, 229, 230, 533, 242/920
See application file for complete search history.

(56) References Cited

U.S. PATENT DOCUMENTS

| | | | | |
|---|---|---|---|---|
| 2,333,535 A | * | 11/1943 | Lauer | 442/60 |
| 2,946,698 A | * | 7/1960 | Brunnick et al. | 427/443 |
| 3,449,152 A | * | 6/1969 | Detrick et al. | 427/294 |

(Continued)

FOREIGN PATENT DOCUMENTS

| | | | |
|---|---|---|---|
| CA | 2076245 A | | 5/1993 |
| DE | 3239922 | * | 5/1984 |

(Continued)

*Primary Examiner* — Jeffrey Wollschlager
*Assistant Examiner* — Stella Yi
(74) *Attorney, Agent, or Firm* — Fitch, Even, Tabin & Flannery, LLP

(57) ABSTRACT

The invention relates to a fiberglass spool comprising a self-supporting roll (12) having layers of windings (20) located one above the other of an optical fiber (13) for transmitting data that may be unwound from the interior of the roll outwards, wherein the windings (20) are fixed to one another by means of an adhesive bonding agent. In order to realize a sufficiently stable, self-supporting roll (12) that may be reliably unwound from the inside outwards without loops being pulled out of the roll (12), the roll (12) is structured as a cross-winding and a hydrocarbon-based, salt water-resistant, chemically inert impregnating material that may be liquefied by heating is used as the bonding agent.

14 Claims, 1 Drawing Sheet

U.S. PATENT DOCUMENTS

| | | | |
|---|---|---|---|
| 3,556,754 A * | 1/1971 | Marsden | 65/448 |
| 4,743,115 A | 5/1988 | Arditty et al. | |
| 4,860,968 A | 8/1989 | Pinson | |
| 5,018,826 A | 5/1991 | Schutten et al. | |
| 5,046,674 A | 9/1991 | Kolschbach et al. | |
| 5,155,788 A | 10/1992 | Chapin et al. | |
| 5,179,613 A | 1/1993 | Cronk | |
| 5,257,339 A | 10/1993 | Darsey | |
| 5,493,627 A | 2/1996 | Pan et al. | |
| 6,561,488 B1 | 5/2003 | Walker | |

FOREIGN PATENT DOCUMENTS

| | | |
|---|---|---|
| EP | 0342663 | 5/1989 |
| EP | 0429238 | 5/1991 |
| EP | 0473350 | 3/1992 |
| GB | 2349440 | 11/2000 |
| JP | 61-296211 A | 12/1986 |
| JP | 63-115107 A | 5/1988 |
| JP | 2-85700 A | 3/1990 |
| JP | 2-215656 A | 8/1990 |
| JP | 5-323127 A | 12/1993 |
| JP | 6-167620 A | 6/1994 |
| JP | 9-71893 A | 3/1997 |
| JP | 2002-211840 A | 7/2002 |
| JP | 2002211840 * | 7/2002 |

* cited by examiner

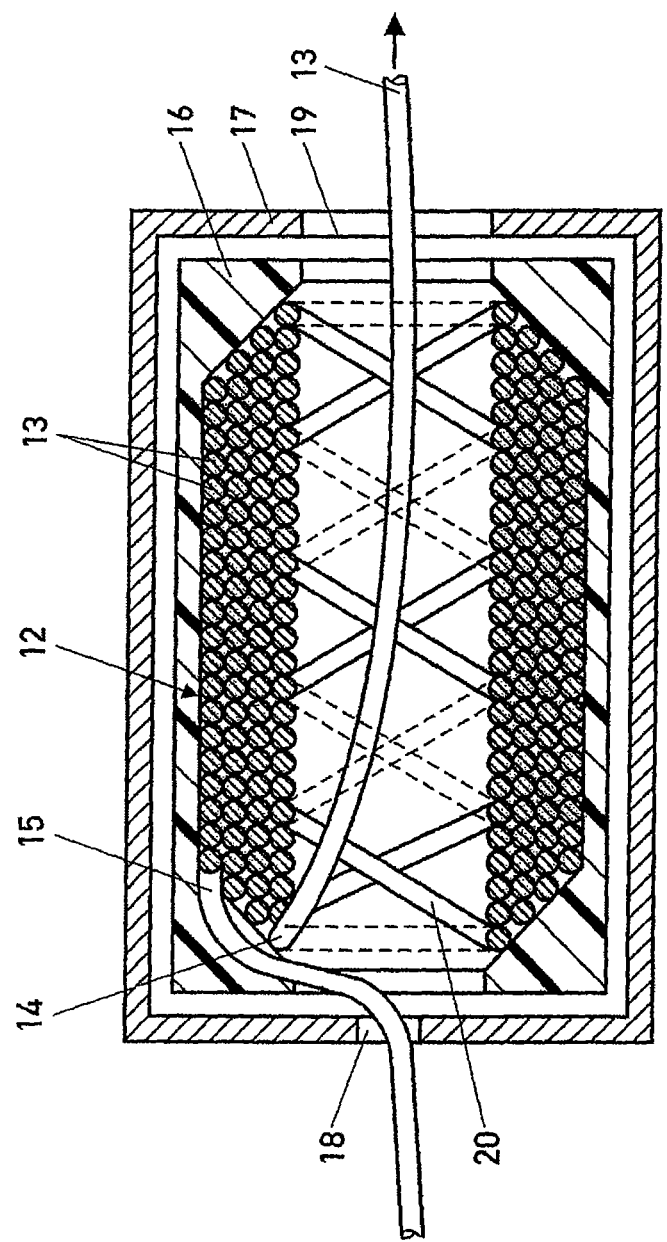

US 8,496,858 B2

SELF-SUPPORTING OPTICAL FIBER SPOOL AND METHOD FOR THE PRODUCTION THEREOF

CROSS-REFERENCE TO RELATED APPLICATIONS

This is a U.S. National Phase of International Application PCT/EP2008/052474, filed Sep. 5, 2008, and claims the benefit of priority under 35 U.S.C. §119 based on German Application No. 10 2007 043 719.8-26, filed Sep. 13, 2007, the entire disclosures of which applications are hereby incorporated herein by reference.

The invention relates to a glass-fibre spool and to a method for its production, according to the precharacterizing clause of claim 1 and claim 7, respectively.

In a known glass-fibre spool of this type (U.S. Pat. No. 5,493,627), a polymer resin dissolved in methane, for example polyvinyl acetate resin such as Vinac B15 or a polyamide resin such as Elvamide 8063 resin from the Dupont Company, is used as the binding agent to stabilize the self-supporting winding. The concentration of the binding agent is chosen so as to achieve an adhesive force which ensures a sufficiently robust, self-supporting winding, from which the glass fibre can be unwound from the interior of the winding, without any risk of the glass fibre being kinked. The glass fibre is wound onto a winding former in a plurality of layers by machine, with the binding agent, dissolved in methanol, being applied to every fourth glass fibre layer by means of a brush during the winding process. Once the winding has been wound completely, the winding former is removed from the winding, and the binding agent cures slowly. The glass fibre spool with a length of 10.5 km of glass fibre wound on it is used to transmit information and data between an underwater vehicle and a projectile which can be deployed from the underwater vehicle, and is, for example, arranged in the underwater projectile, which is deployed from a submarine. During the deployment and during the movement of the projectile and/or of the underwater vehicle, the glass fibre is unwound from the winding.

The invention is based on the object of specifying a glass-fibre spool with a self-supporting winding, which can be unwound reliably from the innermost layer with a low tensile force and without loops being pulled off the winding, or the glass fibre becoming kinked and destroyed, during the unwinding process. Because of the underwater application, the winding to be unwound should not release any environmentally damaging substances during the process.

According to the invention, the object is achieved by the features of claim 1.

The glass-fibre spool according to the invention has the advantage that the use of a crossed-over winding technique to form the winding ensures that the glass fibre is unwound easily and reliably and that the glass fibre being unwound does not also tear off adjacent turns which are adhesively bonded to it, so that no loose loops are formed to impede the glass fibre being unwound from the binding interior. The impregnation substance that is used improves the cohesiveness of the winding and ensures during the unwinding process that the glass fibre is detached uniformly, without any jerking, from the adjacent turn. By virtue of its characteristics, the impregnation substance allows a simplified process to be used for its introduction into the winding, in that the winding is impregnated with the impregnation substance after the latter has been liquefied by heating, for example using a vacuum impregnation process. After solidification again, the impregnation substance has uniform physical characteristics, such as ductility, adhesion force and viscosity, in the normal operating temperature range for the glass fibre, which is between 0° and 40° C. The impregnation substance is solvent-free, has no reservations with regard to health, is not soluble in salt water, and is environmentally friendly.

Expedient embodiments of the glass-fibre spool according to the invention as well as advantageous developments and refinements of the invention will become evident from the further claims 2 to 6.

One advantageous method for production of the glass-fibre spool is specified in claim 7. Rotation of the glass fibre on itself while the crossed-over winding is being wound up ensures that the glass fibre has no twist when it is pulled off.

Expedient embodiments of the method according to the invention as well as advantageous developments and refinements of the method will become evident from the further claims 8 to 15.

The invention will be described in more detail in the following text with reference to one exemplary embodiment, which is illustrated in the drawing. In this case, illustrated schematically, the drawing shows a longitudinal section through a glass-fibre spool.

The glass-fibre spool, which is illustrated schematically in the form of a longitudinal section in the drawing, is used, for example, for data traffic between a submarine and a homing torpedo launched from the submarine. A glass-fibre spool such as this is arranged both in the torpedo and in the submarine, with the glass-fibre ends of the two glass-fibre spools being mechanically and optically connected to one another by means of an optical coupler. One such scenario is illustrated and described, for example, in EP 0 337 254 A2.

As can be seen from the section illustration, the glass-fibre spool has a glass fibre 13 which is wound up to form a multilayer winding 12, for transmission of information and has a length of several kilometres. The initial twisting while the glass-fibre is being wound up ensures that the glass-fibre is not twisted as it runs out. The winding 12 is in the form of a crossed-over winding with crossing turns 20, as is known by way of example from thread spools. In order to illustrate a crossed-over winding such as this, the schematic longitudinal section shows a number of successive turns 20, with that part of the turns 20 which is located at the front, although this cannot actually be seen because of the section location, being shown by dashed lines. The winding start 14 of the winding 12 is located at the start of the innermost turn layer, and the winding end 15 is located at the end of the outermost turn layer. The winding 12 has no winding former, but is designed to be self-supporting, by the individual turns 20 being fixed on one another by means of a suitable adhesive binding agent. An impregnation substance which is resistant to seawater, is chemically inert, can be liquefied by heat and is based on hydrocarbon is used as the binding agent. Examples of the impregnation substance are Vaseline, for example Zinke DAB10 or Merkur Type 641 wax or wax gel, for example Sasol Type Varagel 6527, a mixture of Vaseline and high-melting-point waxes, for example Ceridust 3719 or Ceridust 9325F from the Clariant company, in which case further additives can be mixed with them, a mixture of white oil and wax, for example WOP150PB from the Merkur company with a wax component of 25% to 30% Ceridust 3719, or a mixture of castor oil and calcium soap (calcium-12 hydroxystearate) with a castor-oil component of 85% to 95%. The phase transition temperature of all these substances, at which the phase or the aggregate state changes, that is to say the substances change from the solid phase to the liquid phase and vice versa, is above the normal operating temperature to which the winding 12 is subject. This operating temperature is normally 0° to 40° C.

The self-supporting, dimensionally stable winding 12 is inserted into a hollow-cylindrical mould 16, which is surrounded by a metallic housing 17. The housing 17 is produced from sea-water-resistant aluminium and has openings 18, 19 on the end faces. The opening 18 is used for the glass fibre 13, which continues from the winding end 15, to pass through, and the coaxially arranged opening 19 is used for the glass fibre 13, which leads to the winding start 14, to pass through, and forms the outlet opening for the glass fibre 13 as it is being unwound. In this design, the glass fibre spool is inserted, for example, into a chamber in the stern of a torpedo, with the chamber being flooded via a water inlet. The glass fibre 13 runs centrally out of the winding 13 and is then guided in a guide tube until it emerges from the torpedo body, with the guide tube running centrally through the propulsion motor and the propulsion shaft of the torpedo, and projecting at the end beyond the torpedo propulsor. The glass fibre 13, which leads away from the winding end 15 and is passed out through the opening 19, is connected to a transmitting and receiving device, integrated in the torpedo body, for data traffic.

The described glass-fibre spool is produced as follows:

The long glass fibre 13 is wound by machine onto a winding former in a crossed-over winding configuration with a multiplicity of turn layers located one above the other. During the winding process, the glass fibre 13 is tensioned, and the tensile force acting on the glass fibre 13 is reduced increasingly from winding of the inner turn layer to winding of the outermost turn layer. The tensile force can in this case be reduced continuously or discontinuously from one turn layer to the next. The tensile force is kept constant within one turn layer. This has the advantage that no light losses, or only negligibly small light losses, occur in the glass fibre 13 at the crossing points of the turns 20, which represents slight kink points of the glass fibre 13, so that the attenuation in the transmission of information or data can be kept low. In order to avoid the possibility of the end turns 20 of the winding 12 sliding off during the winding process, the winding 12 has a number of turns 20 per winding layer that decreases from the inside outwards, so that the completed winding 12 has a trapezoidal shape when seen in a section along the winding axis, as can be seen from the drawing. The winding 12 may, of course, also be wound as a complete hollow cylinder.

Once the glass fibre 13 has been wound completely, the winding 12, with the winding former left in it, is removed from the winding machine and is impregnated with the chemically inert, sea-water-resistant impregnation substance based on hydrocarbon, as has been described in various examples above, with the impregnation substance having previously been liquefied by heating to a temperature which is higher than the temperature at which the impregnation substance changes its phase or its aggregate state. In this case, this temperature is higher than 70° C. The winding 12, which is supported by the winding former, is impregnated, for example, by means of a vacuum impregnation process or in a plunge bath. Drips are then allow to fall off the impregnated winding 12 until a predetermined impregnation level is reached for the winding 12. This impregnation level is defined in such a way that the weight of the winding 12, as reduced by drips off it, is measured, and the dripping-off process is terminated on reaching a predetermined weight. The winding 12 is now cooled down to a temperature which is below its phase transition temperature, for example to room temperature. In consequence, the impregnation substance starts to solidify and changes back to its solid, gel-like state. While the winding 12 is cooling down, the winding former is aligned horizontally and is driven to rotate such that the impregnation substance, which is initially still liquid, is distributed uniformly in the winding 12. Once the winding 12 has cooled down, the winding former is removed.

The invention claimed is:

1. A method for producing a glass-fibre spool having a multilayer, self-supporting winding (12) of a glass fibre (13) for transmission of information which can be unwound from the winding interior, in which the glass fibre (13) is wound in a cross-over pattern onto a rotatable winding former to form a winding (12), and the winding former is subsequently removed from the winding (12), wherein said method comprises winding the glass fibre (13) in a cross-over configuration onto the winding former so that the winding (12) has a crossed-over winding pattern;

impregnating the winding (12), with the winding former left in it, with an impregnation substance which is chemically inert, is resistant to seawater, is liquefied by heat and is based on hydrocarbon, wherein a predetermined impregnation level of the winding (12) is set by dripping off a portion of the impregnation substance;

cooling the winding (12) to below the phase transition temperature of the impregnation substance while rotating the winding former and which is aligned horizontally; and removing the winding former from the cooled-down winding (12).

2. The method according to claim 1, wherein the winding step further comprises twisting the glass fibre (13) on each turn when winding the glass fibre (13) in the crossed-over pattern during the winding step.

3. The method according to claim 1, wherein, during the winding step, the glass fibre (13) is subjected to a tensile force, and the tensile force is reduced increasingly from the winding of the innermost turn layer to the winding of the outermost turn layer.

4. he method according to claim 3, wherein the tensile force is kept constant while winding one turn layer.

5. The method according to claim 1, wherein the impregnation substance has a phase transition temperature which is above the maximum operating temperature of the glass-fibre spool.

6. The method according to claim 1, wherein the impregnation of the winding (12) is carried out in a vacuum.

7. The method according to claim 1, wherein said method further comprises determining the impregnation level of the winding (12) by measuring the weight of the portion of the impregnation substance dripping-off winding (12).

8. The method according to claim 1, wherein the impregnation substance comprises petroleum jelly.

9. The method according to claim 1, wherein the impregnation substance comprises a wax or wax gel.

10. The method according to claim 1, wherein the impregnation substance comprises a mixture of petroleum jelly and high-melting-point waxes, and, optionally, further additives.

11. The method according to claim 1, wherein the impregnation substance comprises a mixture of white oil and wax.

12. The method according to claim 1, wherein the impregnation substance comprises a mixture of castor oil-and calcium soap.

13. The method according to claim 12, wherein the mixture contains 85-95% of castor oil.

14. A method for producing a glass-fibre spool of glass fibre for information transmission, wherein said spool comprises a multilayer, self-supporting winding of said glass fibre which can be unwound from the winding interior, the glass fibre is wound in a cross-over pattern onto a rotatable winding former to form a winding, and the winding former is subsequently removed from the winding, wherein said method comprises

- winding said glass fibre in a cross-over configuration onto the winding former so that the winding has a crossed-over winding pattern;
- impregnating the winding while it is on the winding former with an amount of a chemically inert impregnation substance that is resistant to seawater, is liquefied by heat and is based on hydrocarbon so as to obtain an impregnated winding having a predetermined impregnation level of said impregnation substance;
- cooling the thus impregnated winding to below the phase transition temperature of the impregnation substance while rotating the winding former and which is aligned horizontally to obtain a cooled-down winding; and
- removing the winding former from the cooled-down winding to obtain said glass-fibre spool.

* * * * *